United States Patent
Gooch et al.

(10) Patent No.: US 7,516,364 B2
(45) Date of Patent: Apr. 7, 2009

(54) METHOD FOR TESTING NETWORK DEVICES USING BREAKPOINTING

(75) Inventors: Mark Gooch, Roseville, CA (US); Bruce E. LaVigne, Roseville, CA (US); Jonathan M. Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 537 days.

(21) Appl. No.: 11/263,188

(22) Filed: Oct. 31, 2005

(65) Prior Publication Data

US 2007/0101195 A1    May 3, 2007

(51) Int. Cl.
     *G06F 11/00*      (2006.01)
(52) U.S. Cl. .............................. 714/34; 714/35; 714/27
(58) Field of Classification Search .................. 714/34, 714/35, 27
See application file for complete search history.

(56) References Cited

U.S. PATENT DOCUMENTS

| | | | | |
|---|---|---|---|---|
| 5,889,981 A | * | 3/1999 | Betker et al. ................ | 712/227 |
| 7,216,257 B2 | * | 5/2007 | Kilian ........................... | 714/31 |
| 2002/0144207 A1 | * | 10/2002 | Shih et al. .................... | 714/776 |
| 2005/0175018 A1 | * | 8/2005 | Wong ........................... | 370/396 |
| 2005/0188358 A1 | * | 8/2005 | Johnson et al. ............. | 717/129 |
| 2005/0257089 A1 | * | 11/2005 | Williams et al. .............. | 714/34 |
| 2006/0117099 A1 | * | 6/2006 | Mogul ........................ | 709/223 |
| 2006/0187947 A1 | * | 8/2006 | Ng .............................. | 370/412 |
| 2007/0055958 A1 | * | 3/2007 | Birenheide et al. .......... | 717/124 |
| 2007/0204203 A1 | * | 8/2007 | Chou et al. .................. | 714/770 |
| 2008/0072103 A1 | * | 3/2008 | Lou ............................. | 714/38 |

* cited by examiner

*Primary Examiner*—Marc Duncan (57) ABSTRACT

A method for testing a network device having modules for receiving and sending data packets in a network includes generating in the network device at least one internal data structure associated with a data packet received by the network device from the network. A predefined action on the network device is then preformed responsive to the internal data structure indicating that the data packet satisfies a predefined condition.

18 Claims, 5 Drawing Sheets

METHOD FOR TESTING NETWORK DEVICES USING BREAKPOINTING

FIELD OF INVENTION

The present invention relates generally to network devices, and in particular, to tracking data packets in a network device.

BACKGROUND OF THE INVENTION

Debugging problems and testing corner cases (i.e., conditions that are influenced by many factors and difficult to create) within networking hardware typically requires two major components—controllability and observability. Without these components, much debug and test work is reduced to viewing the system as a black box, which impedes rapid progress. The use of "breakpointing" is known in software testing and debugging operations, and typically involves setting traps at certain key points in the code. When these traps are encountered, control is handed to the user who can then determine the state of the system (e.g., by reading variables and examining memory contents). However, such functionality is not available within networking switch/router hardware products, making many aspects of debug and test more difficult and time consuming to achieve.

SUMMARY OF THE INVENTION

The present invention is directed to a method and apparatus for testing a network device having modules for receiving and sending data packets. The method includes generating in the network device at least one internal data structure associated with a data packet received by the network device from the network. A predefined action on the network device is then preformed responsive to the internal data structure indicating that the data packet satisfies a predefined condition.

DETAILED DESCRIPTION OF THE INVENTION

Broadly stated, the present invention is directed to a method for testing and debugging network devices such as switches and routers. The method includes implementing breakpointing in data packets that are sent and received by a network device. As each data packet enters the network device, it is decoded to generate an input data structure containing a summary of the packet. An extra bit ("breakpoint") is added to this summary information indicating that the data packet is a breakpoint packet. The breakpoint bit is carried forward through the network device in the input data structure and/or subsequent data structures created by the network device. Thus, the breakpoint bit flows throughout the entire system, and is available to be set or acted upon by any logic in the packet path.

Figure 1:
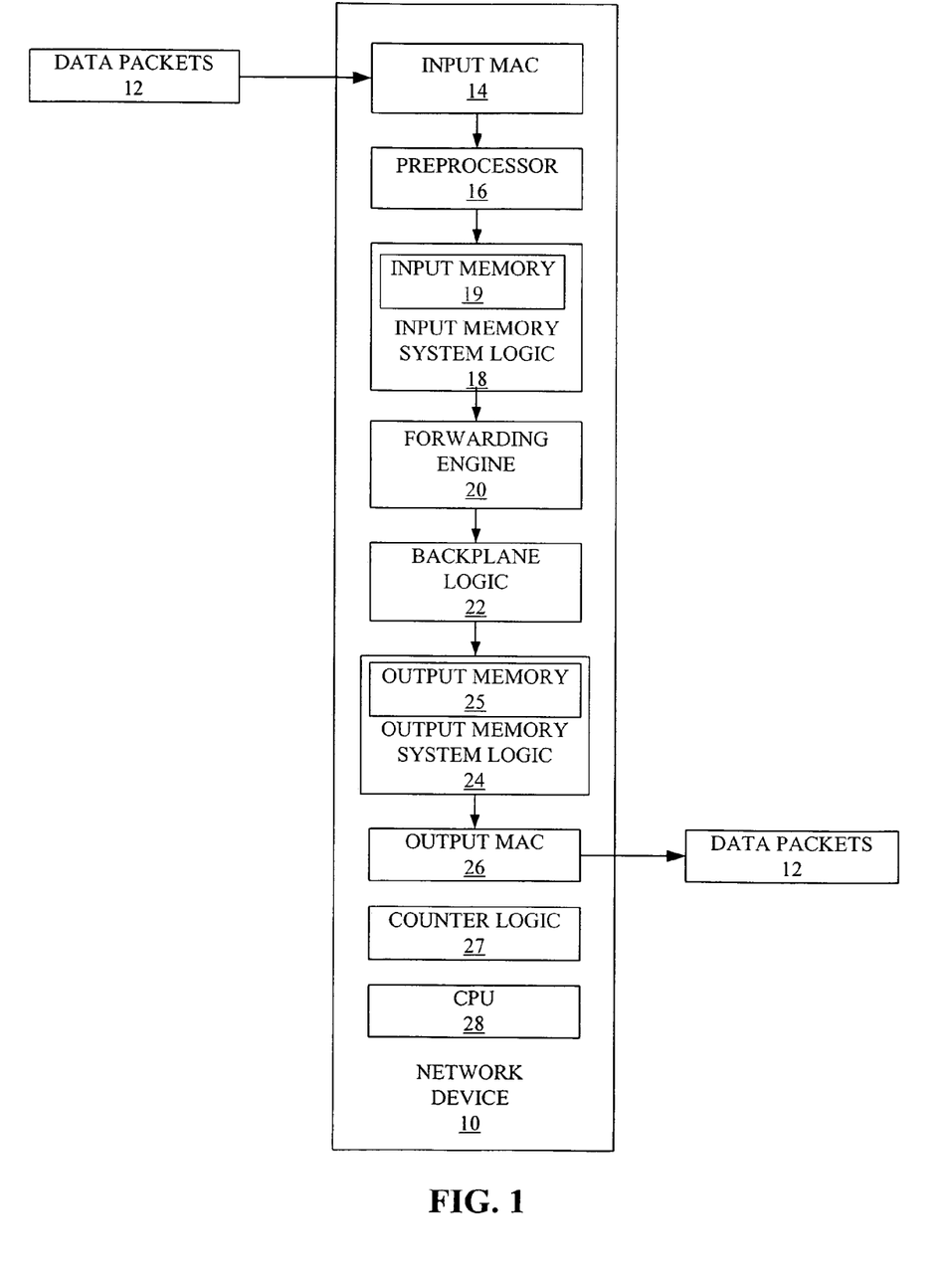
FIG. 1 is a block diagram of a network device in accordance with one embodiment of the present invention.

Turning now to FIG. 1, a network device 10 in accordance with the present invention may be in the form of a hub, a switch, a router, an intrusion detection/prevention system, a firewall, a wireless access point, or any similar type device used to send traffic across a network, and also may be wired or wireless. The network device 10 includes a number of distinct areas of logic, or modules, that are used to receive and forward data packets. A plurality of input media access control modules (MACs) 14 may be included in the network device 10 for converting the received data packets 12 from the network (not shown) from the physical (electrical) representation to a normal binary logic format recognized by the other logic blocks or modules in the network device 10. The input MACs 14 correspond to each of the several input ports (not shown) typically provided in the network device 10.

A preprocessor 16 corresponding to each input MAC 14 is provided for determining the packet characteristics, for example, the address type (unicast, multicast, broadcast), packet encapsulation (Ethernet, SNAP, etc.), protocol type (IPv4, IPv6, IPX, etc.), and transport type (TCP, UDP, etc.). The data packets 12 forwarded from the preprocessor 16 are then stored in an input memory 19, which may include a number of buffers that are controlled by the input memory system logic 18. A forwarding engine 20 determines where and how to forward the data packets 12 to various destinations in the network based on the packet characteristics and addresses.

Backplane logic 22 sends the data packets 12 from the forwarding engine 20 across an interconnect technology (typically referred to as an interconnect fabric) to output memory system logic 24. The output memory system logic 24 uses an output memory 25 to store the data packets 12 from the backplane logic 22 in a number of buffers (commonly referred to as queues) corresponding to the output ports (not shown) in which the data packets are designated to be sent before they are sent out of a port or ports (not shown). The interconnect fabric can take a number of forms, depending on the requirements of the product, for example a point-to-point parallel data bus, a high-speed serial data bus, a crossbar-type interconnect, etc. This interconnect fabric may also involve active components (e.g. other chips) to facilitate the building of large multi-chip systems.

A plurality of output MACs 26 convert the data packets 12 stored in the output memory 25 into physical (electrical) representation before sending the packets out to a corresponding output port or ports (not shown). Counter. logic 27 is provided to count the data packets 12 that have a predetermined type of information associated therewith. For example, the counter logic 27 might count every data packet 12 which is the start of a new TCP connection. A CPU 28 serves to coordinate the functions of the above-described modules in the network device 10, and enables a user to access the various modules of the network device 10 and make adjustments to their operation, if necessary.

One embodiment of the invention includes setting a breakpoint bit in the internal data structures associated with a data packet 12. These internal data structures are generated by the network device 10, and although associated with each packet, do not necessarily occupy the same memory space as the data packets 12 (they may well be stored in entirely separate physical memory).

Figure 2A:
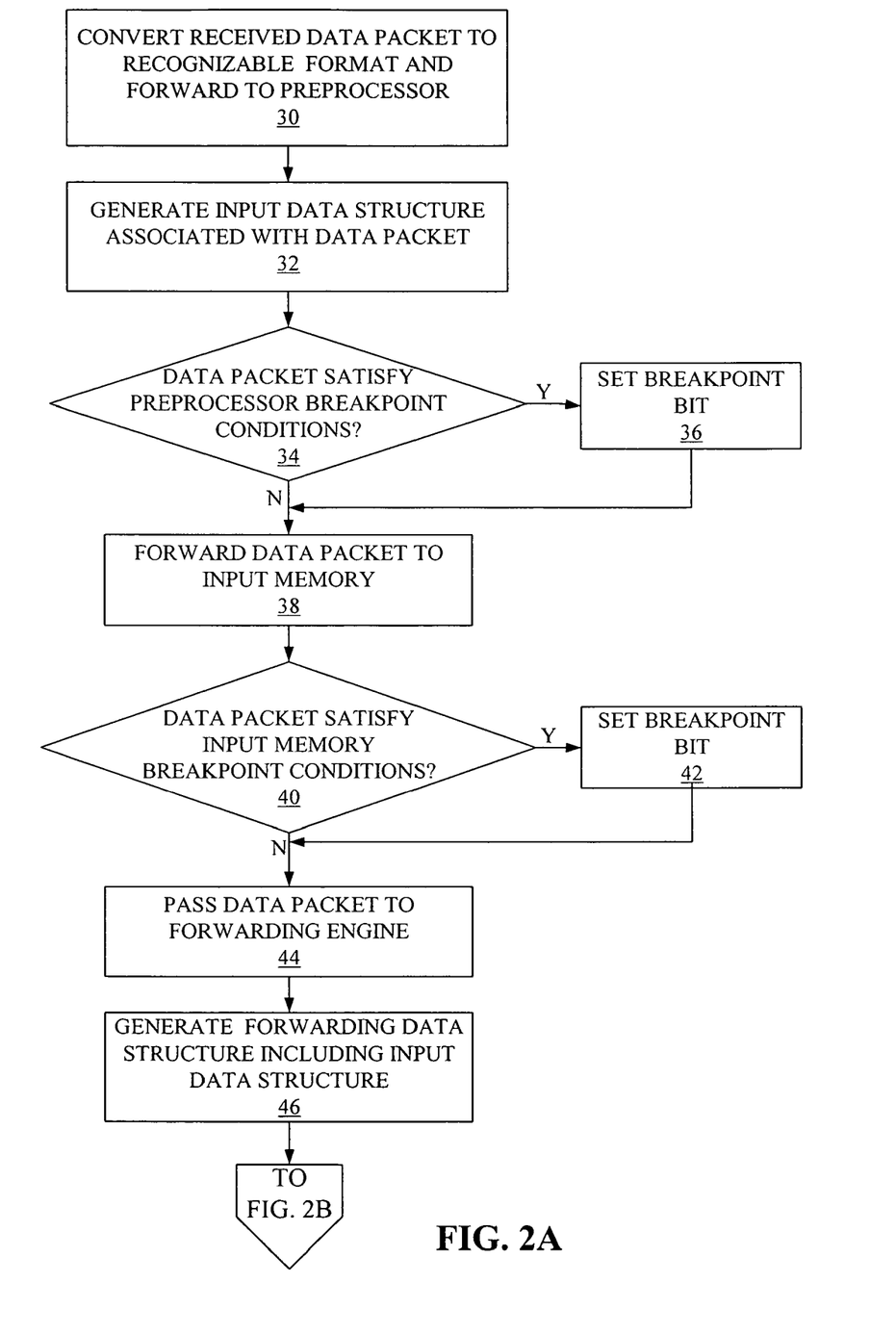
FIGS. 2A-2B are flowcharts for describing the operations for setting breakpoint bits in internal data structures in accordance with one embodiment of the present invention.
Figure 2B:
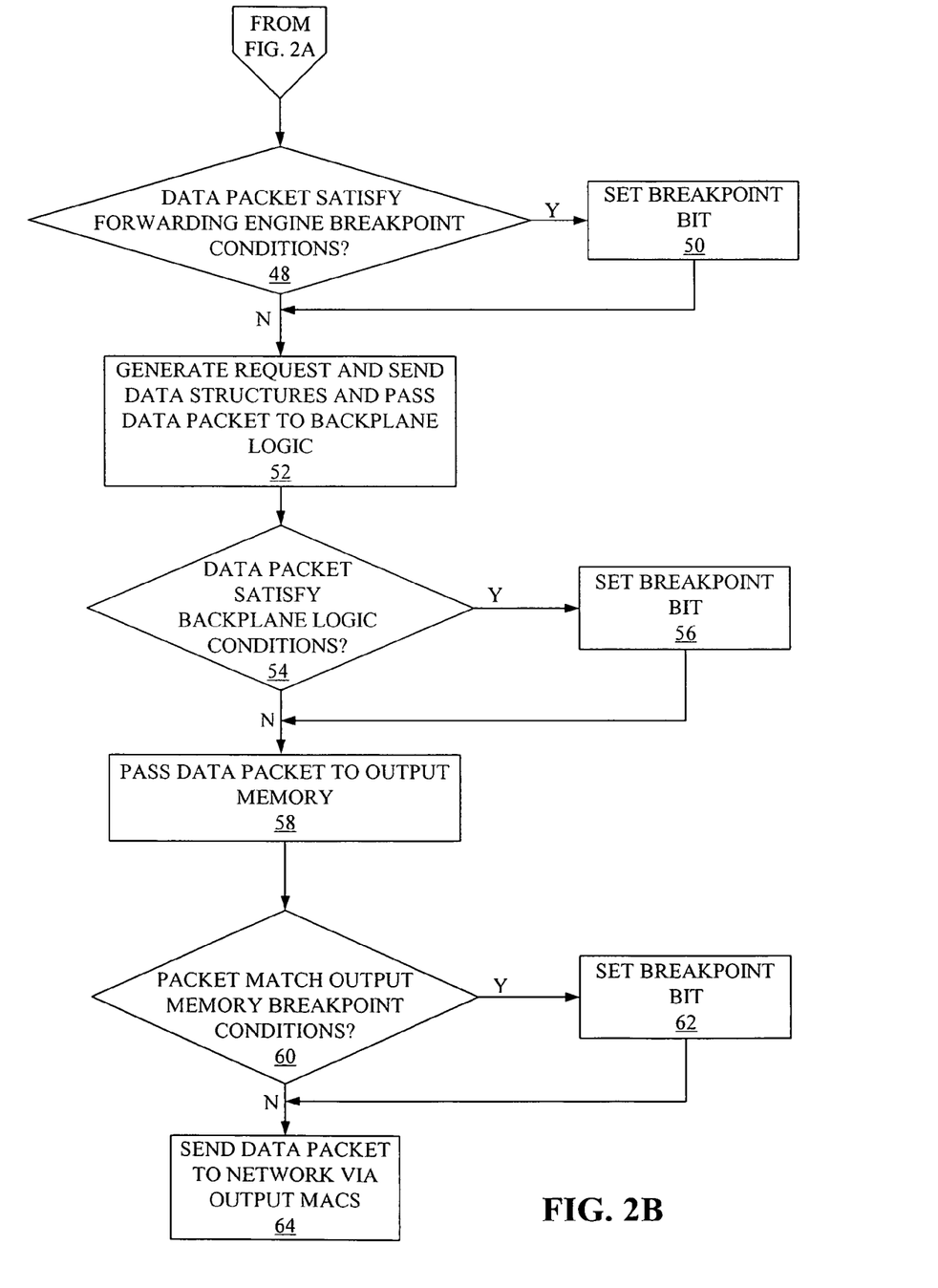
Figure 3:
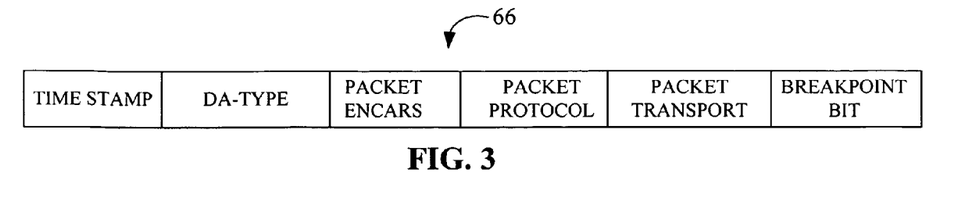
FIG. 3 is a sample input data structure generated by a preprocessor shown in FIG. 1.

Turning now to FIGS. 2A-2B, the process for setting a breakpoint bit in internal data structures is described in more detail. When a data packet 12 is received by the network device 10 through one of the input MACs 14, it is converted into a recognizable format and forwarded to the corresponding preprocessor 16 (block 30). The preprocessor 16 then decodes the data packet 12 to generate an input data structure 66 associated with the data packet (block 32). A sample input data structure 66 is shown in FIG. 3, including a number of fields indicating various information associated with the data packet 12, such as, for example, the time of receipt of the packet (TIME STAMP); destination address type (DA-TYPE), (unicast, multicast, broadcast); packet encapsulation (PACKET ENCAPS), (Ethernet, SNAP, etc.); packet protocol (PACKET PROTOCOL), (IPv4, IPv6, IPX, etc.); packet transport type (PACKET TRANSPORT), (TCP, UDP, etc.). The preprocessor 16 also determines whether the data packet 12 satisfies a condition for setting a breakpoint bit associated with the data packet (block 34). If so, a BREAKPOINT BIT is set in the input data structure 66 (block 36). The conditions for setting the BREAKPOINT BIT may be any of various conditions such as, for example, setting the BREAKPOINT BIT for all VLAN tagged packets, or all packets that represent the start of a new TCP connection, or all packets that are of a particular length or within a range of lengths, or all packets that match a particular. data pattern in the packet. The BREAKPOINT BIT might also be set by counting the number of packets received, for example, setting the BREAKPOINT BIT on every tenth packet received. Additionally, the BREAKPOINT BIT might also be set for a combination of the above stated conditions, for example, setting the BREAKPOINT BIT on every fifth new TCP connection, or every twentieth packet that is longer than 1500 bytes.

If none of the breakpoint conditions are met, or after the BREAKPOINT BIT has been set, the data packet 12 is forwarded to the input memory system logic 18 (block 38). The input memory system logic 18 determines whether the data packet 12 satisfies conditions related to the input memory 19 for setting a breakpoint bit in the input data structure 66 (block 40). These conditions might be, for example, that the input buffer (or queue) into which that packet is to be written is greater than a certain programmable percentage full (e.g. 50%, 90%, etc.), or that the entire input memory is greater than a certain programmable percentage full (e.g. 60%, 80%, etc.), or that the input memory system logic is currently unable to send packets to the forwarding engine 20 as the forwarding engine 20 is already processing many packets. If any of the conditions are met, the input memory system logic will set a BREAKPOINT BIT, if not set previously, in the input data structure 66 or leave the BREAKPOINT BIT set in the input data structure 66 if it was already set by the preprocessor 16 (block 42). If the data packet 12 does not match any of the breakpoint conditions of the input memory system 18, or after the BREAKPOINT BIT has been set, the data packet 12 is stored in the input memory 19.

When the forwarding engine 20 is able to process a packet, the data packet 12 is forwarded to the forwarding engine 20 (block 44) by the input memory system logic 18. Upon receiving the data packet 12 and input data structure 66 from the input memory system logic 18, the forwarding engine 20 creates a forwarding data structure 68, such as the one shown in FIG. 4. The forwarding data structure 68 may also be separate from the data packet 12 and includes information such as, for example, the destination port (DA-LOGPORT) that the data packet is to be forwarded to, and the destination MAC address (DA-MAC) of the packet as it exits the network device 10. The forwarding data structure 68 incorporates the input data structure 66 created in the preprocessor 16.

Figure 4:
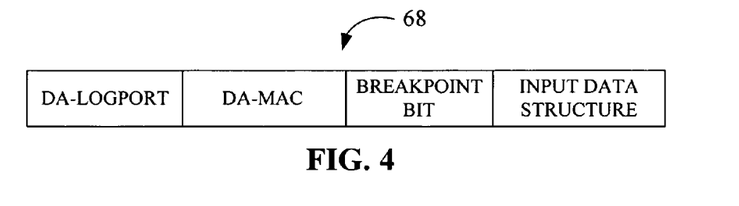
FIG. 4 is a sample forwarding data structure generated by a forwarding engine shown in FIG. 1.

The forwarding engine 20 determines whether a condition has been met which would require setting a breakpoint bit in the forwarding data structure 68 (block 48). Such conditions may include, for example, that the packet is sent from a specific MAC or IP address or subnet (i.e. a comparison with some, or all, of the bits in the MAC source address or IP source address, as appropriate) or the packet is to be sent to a specific MAC or IP address or subnet (i.e. a comparison with some, or all, of the bits in the MAC destination address or IP destination address, as appropriate), or that the packet is to be sent to a specific destination (output) port, or that the packet has matched an Access Control List (ACL) security rule, or that the packet has matched a Quality of Service (QoS) rule. If it is determined that a breakpoint bit needs to be set, a BREAKPOINT BIT is set in one of the fields in the forwarding data structure 68 (block 50). Alternatively, if the breakpoint bit was previously set in the input data structure 66, and it was not cleared, the BREAKPOINT BIT in the input data structure can be used as the breakpoint bit in the forwarding data structure 68.

Figure 5:
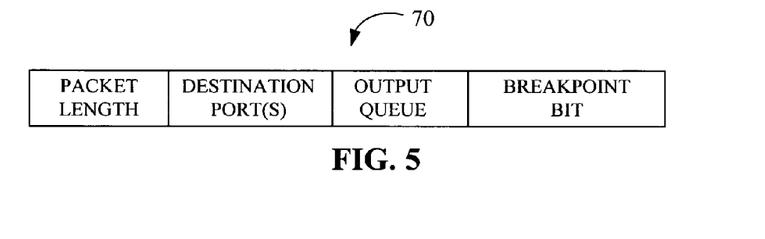
FIG. 5 is a sample request data structure generated by a backplane logic shown in FIG. 1.
Figure 6:
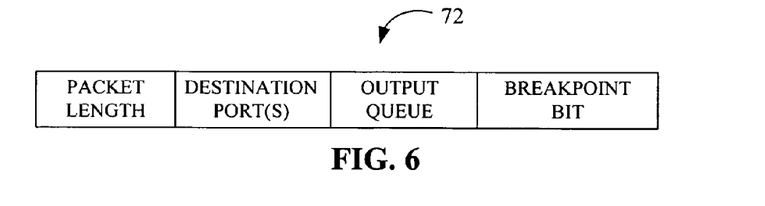
FIG. 6 is a sample send data structure generated by a backplane logic shown in FIG. 1.

If a breakpoint bit is not set, or after the BREAKPOINT BIT has been set, the data packet 12 is passed onto the backplane logic 22 which uses the forwarding data structure 68 to generate request and send data structures 70 and 72 that are sent to the backplane logic 22 (block 52). The input data structures 66 and the forwarding data structures 68 are discarded at this point. Examples of a request data structure 70 and a send data structure 72 are shown in FIGS. 5 and 6, respectively. These structures provide the information necessary to correctly transfer the data packet 12 to the output memory system logic 24 and store it in the output memory 25, and may include, for example, the packet length (PACKET LENGTH), the destination output port (or ports) (DESTINATION PORT(S)), and the output queue (OUTPUT QUEUE) into which the data packet should be stored. Here. again, the backplane logic 22 determines whether a breakpoint bit, should be set based on predefined conditions such as, for. example, backplane congestion, packet length, or FIFO wrap points (block 54). If a condition is met, a BREAKPOINT BIT is set in the request data structure 70 and/or the send structure 72 (block 56). If the conditions for setting a breakpoint bit are not satisfied or after a BREAKPOINT BIT has been set, the data packet 12 is then passed through to the output memory system logic 24 (block 58) and stored in the output memory 25.

Figure 7:
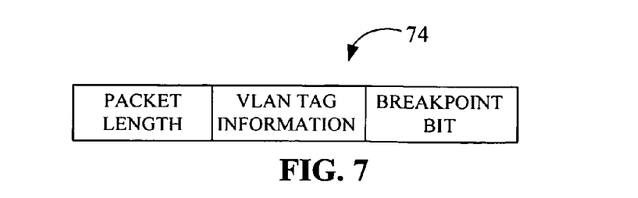
FIG. 7 is a sample output data structure generated by an output memory system logic shown in FIG. 1.

The output memory system logic 24 uses the request and send data structures 70, 72 to generate an output data structure 74 that is associated with the data packet 12. The request and send data structures 70, 72 are discarded at this point. Here again, the output memory system logic 24 determines whether conditions for setting a breakpoint bit have been satisfied (block 60). If so, a breakpoint bit is set in the output data structure 74 (block 62). If such condition has not been satisfied, or after the BREAKPOINT BIT has been set, the data packet is then output to the network via one of the output MACs 26 (block 64). An example of an output data structure 74 is shown in FIG. 7. This structure provides the information necessary to correctly send the packet out of the destination port, for example, the packet length (PACKET LENGTH) and VLAN tag information (VLAN TAG INFORMATION). The output MAC 26 uses and discards the output data structure 74 when sending the data packet to the network.

Figure 8:
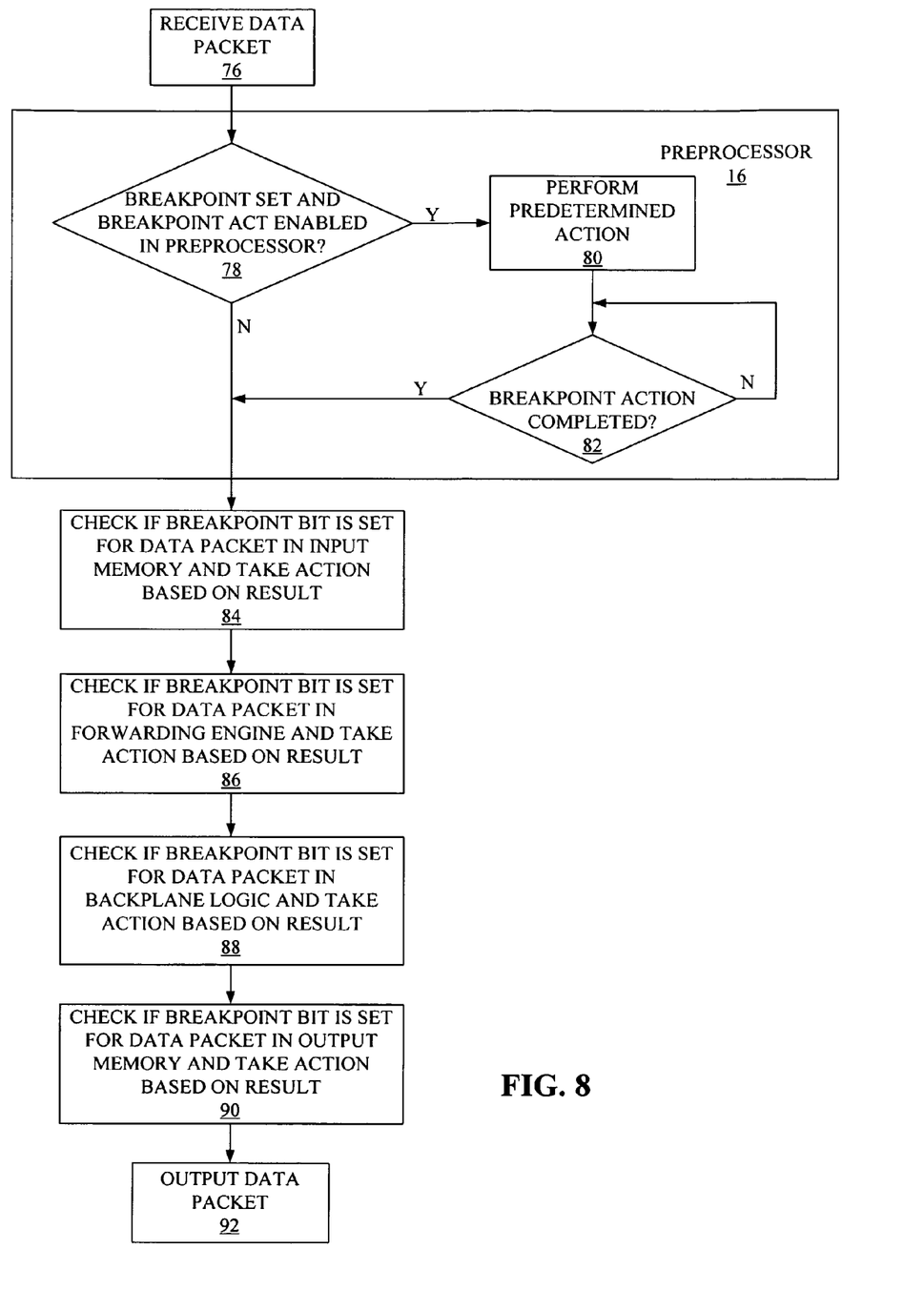
FIG. 8 is a flowchart describing the operations for checking whether a breakpoint bit has been set in internal data structures.

Turning now to FIG. 8, another embodiment of the present invention includes checking to see whether a breakpoint bit has been set in an internal data structure, and taking appropriate action based on this determination. More specifically, when a data packet 12 is received (block 76) in the network device 10, the preprocessor 16 checks the input data structure 66 to determine whether the BREAKPOINT BIT has been set (block 78). If so, the preprocessor 16 performs any of the predetermined actions (block 80). For example, the preprocessor 16 may be set to do nothing, pause processing to allow inspection of the data packet 12 and the internal state of the preprocessor or any other logic within the network device 10, inject an error into the packet, or cause the. packet to receive extra processing using either an internal or external network processor or CPU 28.

Once the predetermined action has been completed (block 82), the same processes of checking to see if a breakpoint bit has been set in the internal data structure corresponding to the module where the data packet is currently located, performing a predetermined breakpoint action and determining whether the action has been completed as described above in blocks 78-82 are repeated for all or at least one of the subsequent modules in the network device 10, i.e., the input memory system logic 18 (block 84), the forwarding engine 20 (block 86), the backplane logic 22 (block 88), and the output memory system logic 24 (block 90). Then the data packet 12 is output to the network (block 92).

One advantage of the present invention is the ability to use the breakpoint bit from one module as a part of the breakpoint generation for a subsequent module. This allows complex breakpoint conditions to be constructed. For example, if it is desired to test the condition of seeing a data packet 12 that is the start of a new TCP connection, the preprocessor 16 could be configured to set the BREAKPOINT BIT in the input data structure 66 on every packet that is the start of a new TCP connection (e.g., packet type is IPv4, transport type is TCP, TCP syn flag is set). The input memory system logic 18 could then be configured to set the BREAKPOINT BIT if the input memory 19 for the data packet has less than, for example, 1500 bytes, of space available, AND the BREAKPOINT BIT from the preprocessor 16 is set. The result is that the BREAKPOINT BIT from the input memory system logic 18 is set only if all of the above conditions are met. In other words, there is a chaining operation that allows for building complex conditions for when the breakpoint bit is set by utilizing the capabilities of multiple modules.

Moreover, it should be recognized that each module also has the ability to clear the breakpoint bit set by another module. This allows isolation of parts of the system and allows the breakpoint bit to be used for different purposes in different modules. For example, the preprocessor 16 could set the breakpoint bit for some condition and the input memory system logic 18 could act on this breakpoint bit and also clear it. The forwarding engine 20 could then set the breakpoint bit for some other condition, and this could then be used by the backplane logic 22. Thus the backplane logic 22 would only see the breakpoint bit set if the forwarding engine 20 had set it, and would have no knowledge of whether (or why) the preprocessor 16 set it.

In one embodiment of the present invention, counter logic 27 is implemented to count the data packets 12 having an associated internal data structure with the breakpoint bit set. The counter logic 27 contains a number of individual counters that are associated with each module in the network device 10 (i.e., the preprocessor 16, the input memory system logic 18, etc.). The counter logic 27 need not be all contained 25 within one discrete module, but may be distributed throughout the other modules in the network device 10. Thus each of the modules in the network device 10 may have their own independent counter logic.

The counter logic 27 allows verification that specific test cases have actually been tested. In the example given above (where the preprocessor 16 is configured to set breakpoint on every packet that represents the start of a new TCP connection, and the input memory system logic 18 is configured to set the BREAKPOINT BIT if the input memory 19 for the packet has less than 1500 bytes of space available AND the BREAKPOINT BIT from the preprocessor is set), the counter associated with the input memory system logic 18 can count the number of times the breakpoint bit has been set. In this manner, it is possible to identify the corner case to be tested, and ensure that the actual testing has covered this corner case. If the breakpoint counter remains at 0 after the test, then the test has not achieved its goal and needs to be modified or ran for more time, etc.

Another use of the counter logic 27 is as an aid to test and debug when data packets 12 can be dropped (discarded) on their way through the network device 10. Such a drop (discard) operation may be a part of normal device operation (for example, the data packet 12 violated a security rule, or was subject to bandwidth limitations enforced by the user, etc.) or may be indicative of a defect in the logic design of one (or more) of the modules within the network device 10. By identifying the criteria for dropped packets using the BREAKPOINT BIT in the appropriate data structure, the counter logic 27 can be used to determine both whether the drop operation occurred, and also where it occurred.

For example, the preprocessor 16 can be configured to set the BREAKPOINT BIT in the input data structure 66 for all packets that represent the start of a new TCP connection. All subsequent modules can then be configured to pass this BREAKPOINT bit through in their own data structures (e.g., the input data structure 66, the forwarding data structure 68, etc.). By examining the individual counters for each module, it is possible to determine where the data packet 12 was dropped. Using the above example, if the counter associated with the preprocessor 16 has a value of 50 (indicating that 50 packets representing the start of a new TCP connection were processed by the preprocessor 16), but the counter associated with the backplane logic 22 has a value of 40 (indicating that only 40 packets representing the start of a new TCP connection were seen by the backplane logic 22), then this indicates that 10 of the packets were dropped by logic between the preprocessor 16 and backplane logic 22 (i.e. either the input memory system logic 18 or the forwarding engine 20 in this case). Such information can be used as a further means of verifying that the network device 10 is being tested in the manner required and behaving as expected, and can also help to diagnose problems within the network device 10.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for testing a network device having a plurality of modules for receiving and sending data packets in a network, said method comprising:

generating in the network device at least one internal data structure associated with a data packet received by the network device from the network, said internal data structure including a plurality of fields related to a plurality of characteristics of the data packet;

performing a predefined action on the network device responsive to said internal data structure indicating that the data packet satisfies a predefined condition; and setting a breakpoint bit in said internal data structure if the data packet received meets said predefined condition.

2. The method as defined in claim 1 further comprising determining whether said breakpoint bit is set in said internal data structure.

3. The method as defined in claim 2, wherein said at least one internal data structure is generated for each select module of said network device.

4. The method as defined in claim 3, wherein said steps of determining whether said breakpoint bit is set and performing the predefined action is taken at each said select module.

5. The method as defined in claim 3, wherein a first internal data structure corresponding to a first select module is used as the predefined condition for setting a breakpoint bit in a second internal data structure corresponding to a second select module.

6. The method as defined in claim 5, wherein said breakpoint bit in said second internal data structure is set if a breakpoint bit in said first internal data structure corresponding to said first module is set.

7. The method as defined in claim 3, further comprising using a second select module to clear a breakpoint bit set by a first select module.

8. The method as defined in claim 2 further comprising counting data packets received by the network device having associated internal data structures with the breakpoint bit set and performing the predefined action based on a predetermined count thereof.

9. The method as defined in claim 1, wherein said fields of said internal data structure are predefined for corresponding modules of said network device.

10. A method for testing a network device having a plurality of modules for receiving and sending data packets in a network, said method comprising:

receiving a data packet from the network;

generating in at least one select module an internal data structure associated with the data packet received, said internal data structure including a plurality of fields related to a plurality of characteristics of the data packet;

setting a breakpoint bit in said internal data structure if the received data packet meets a predefined condition;

determining whether said breakpoint bit is set in said internal data structure;

performing a predefined action on the network device responsive to said breakpoint bit being set in said internal data structure; and sending the data packet to the network.

11. A network device having a plurality of modules for transmitting data packets in a network, comprising:

a processor for determining a plurality of characteristics of a data packet received from the network;

an input memory for storing the data packet;

a forwarding engine for forwarding the data packet to a destination in the network based on the characteristics of the data packet; and, an output memory for storing the data packet prior to being sent to the network;

wherein at least one of said processor, said input memory, said forwarding engine and said output memory generates an internal data structure associated with the data packet received by the network device, and at least one of said processor, said input memory, said forwarding engine and said output memory performs a predefined action on said network device if said internal data structure indicates that the data packet satisfies a predefined condition, said internal data structure includes a plurality of fields related to a plurality of characteristics of the data packet, and said at least one of said processor, said input memory, said forwarding engine and said output memory determines that said predefined condition has been satisfied when a breakpoint bit is set in said internal data structure.

12. The network device as defined in claim 11, wherein at least one of said processor, said input memory, said forwarding engine and said output memory sets said breakpoint bit in said internal data structure if the data packet meets said predefined condition.

13. The network device as defined in claim 12, wherein the data packet is transferred sequentially between the plurality of modules including said processor, said input memory means, said forwarding engine, said output memory means, and a previous internal data structure corresponding to a previous module is used as the predefined condition for setting a breakpoint bit in a subsequent internal data structure corresponding to a subsequent module.

14. The method as defined in claim 13, wherein said breakpoint bit in said subsequent internal data structure is set if said breakpoint bit in said previous internal data structure corresponding to a previous module is set.

15. The network device as defined in claim 11, further comprising means for counting the data packets having an internal data structure with said breakpoint bit set.

16. The network device as defined in claim 11, further comprising means for sending the data packet from said forwarding engine to said output memory means.

17. A network device as defined in claim 11 further comprising input means for converting the data packet received from the network to a format recognized by at least said processor; and an output means for converting the data packet back to a format received from the network.

18. A network device as defined in claim 11 further comprising a controller for controlling at least said processor, said input memory means, said forwarding engine and said output memory means.

* * * * *

UNITED STATES PATENT AND TRADEMARK OFFICE
CERTIFICATE OF CORRECTION

PATENT NO. : 7,516,364 B2
APPLICATION NO. : 11/263188
DATED : April 7, 2009
INVENTOR(S) : Mark Gooch et al.

Page 1 of 1

It is certified that error appears in the above-identified patent and that said Letters Patent is hereby corrected as shown below:

In column 5, line 66, after "contained" delete "25".

Signed and Sealed this

Sixteenth Day of February, 2010

David J. Kappos
*Director of the United States Patent and Trademark Office*